March 6, 1951  F. R. WHITCOMB  2,544,625
WORK HOLDER
Filed May 19, 1947  2 Sheets-Sheet 1

INVENTOR.
Forrest R. Whitcomb
BY Charles R. Fay,
Attorney

March 6, 1951 F. R. WHITCOMB 2,544,625
WORK HOLDER
Filed May 19, 1947 2 Sheets-Sheet 2
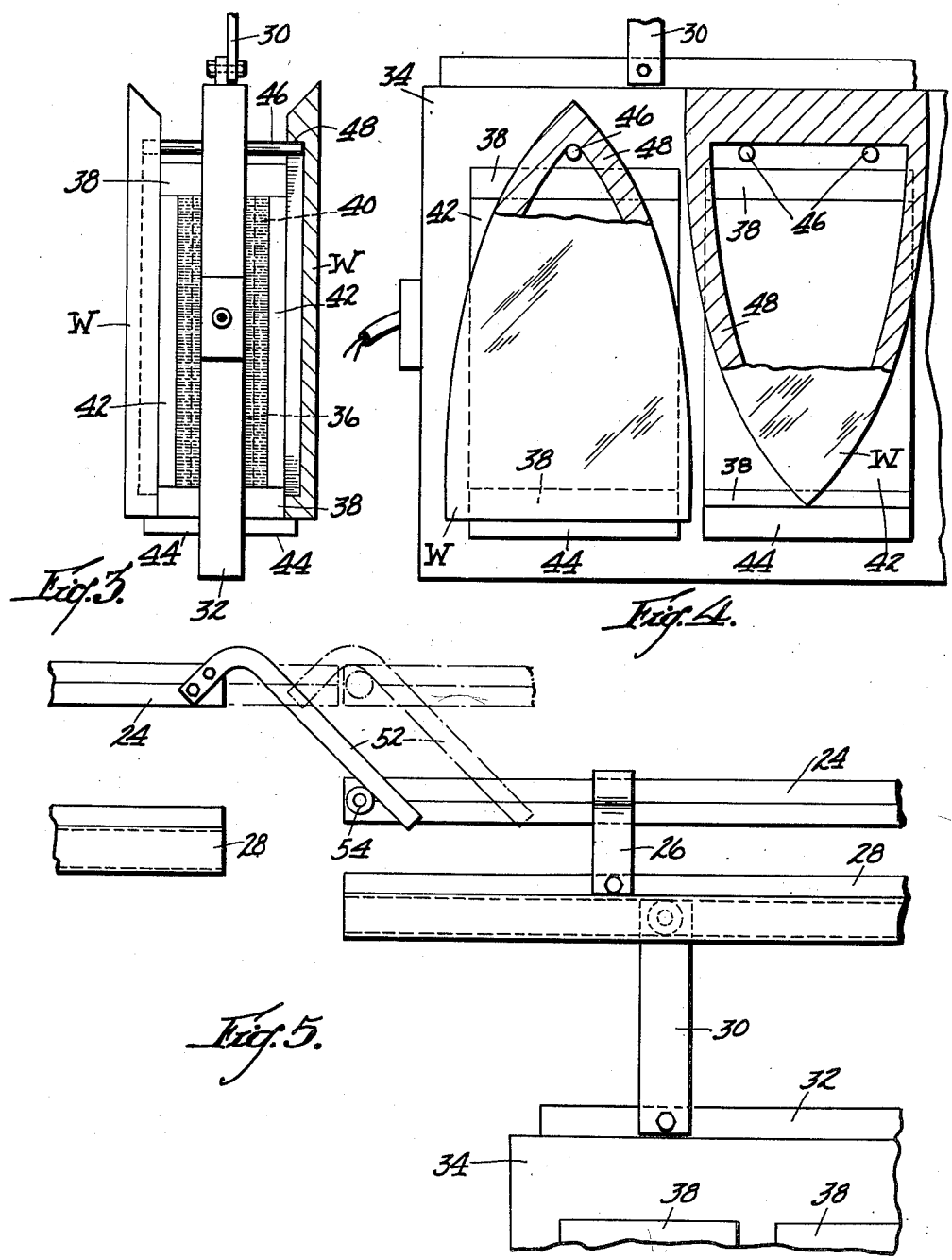
INVENTOR.
Forrest R. Whitcomb
BY Charles R. Fay,
ATTORNEYS.

Patented Mar. 6, 1951

2,544,625

UNITED STATES PATENT OFFICE 2,544,625

WORK HOLDER

Forrest R. Whitcomb, Worcester, Mass.

Application May 19, 1947, Serial No. 748,884

5 Claims. (Cl. 51—84)

This invention relates to new and improved work holders of general application but particularly adapted to material working machines of the type disclosed in copending application S. N. 731,145, filed February 26, 1947 and which issued as Patent No. 2,505,223 on April 25, 1950, wherein is disclosed a machine having a pair of rolls for grinding or polishing both sides of a work piece. The present invention provides a novel work holder which is effective to hold work pieces at two opposite side surfaces thereof so that the holder may be reciprocated between the rolls and the work pieces worked upon simultaneously by the rolls, during the reciprocation of the holder. In the new work holder, the work pieces are held in such a manner as to present the surfaces to be worked to the rolls in a completely unencumbered condition, in the absence of the usual mechanical clamps, racks, etc., conventionally employed, and to this end means is provided in the work holder to cause the work pieces to adhere to the two opposite side surfaces thereof, while the work holder itself is supported at an edge, that is, at neither of the work holding surfaces. As an example, the work holder may be suspended by one edge at a position between the two material working rolls, or other types of tools, as shown in the appended drawings to illustrate the invention.

The principal objects of the invention are to provide a work holder or chuck as above described, with the consequent advantages of doubling the capacity of the machine, lowering costs, and working the surfaces of the work pieces on a true flat plane, thus avoiding undesired and unintentional beveling at the edges of the work; to provide a novel narrow, flat magnetic work holding chuck having a pair of opposed narrowly spaced work holding surfaces; to provide a work holding chuck as above described in combination with a double opposed tool for working at both sides of the chuck simultaneously; to provide means to suspend the chuck by an edge between the tools; to provide means to reciprocate the chuck; to provide a rail on which the chuck is mounted for movement thereof in a direction transverse to the direction of reciprocation of the chuck; to provide a second rail, or more in series with automatic rail alining and leveling means to aline the rails for transfer of the chuck from one independent rail to another for finishing or other separate operations without the necessity of removing the work or the chuck from the machine; and to provide work positioning means on the work holding surfaces of the chuck or work holder.

Other objects and advantages of the invention will appear hereinafter.

Reference is to be had to the accompanying drawings in which

Fig. 3 is an end view of the work holder, parts being in section;

Fig. 4 is a side view of the work holder, parts being broken away and sectioned;

Fig. 5 is an enlarged diagrammatic view of the rail leveling device; and

Figure 1:
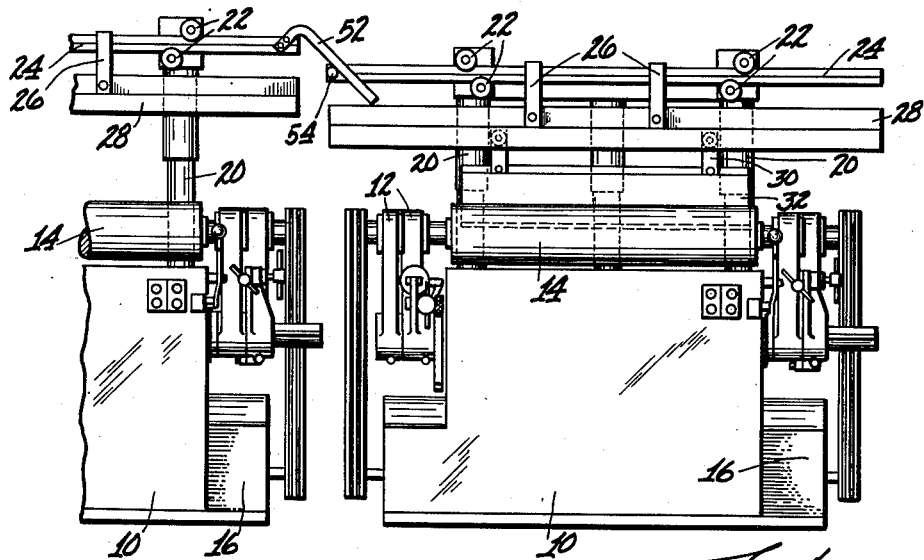
Fig. 1 is a view in front elevation showing the invention in use, parts being broken away.
Figure 2:
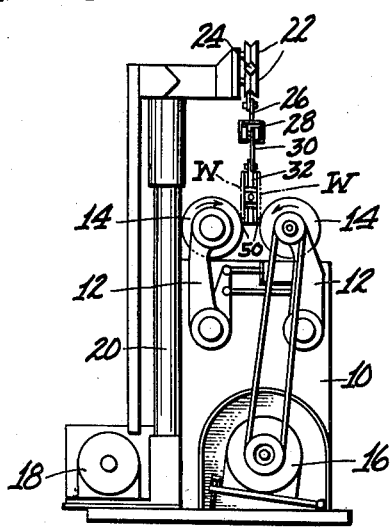
Fig. 2 is an end view of the apparatus of Fig. 1.
Figure 6:
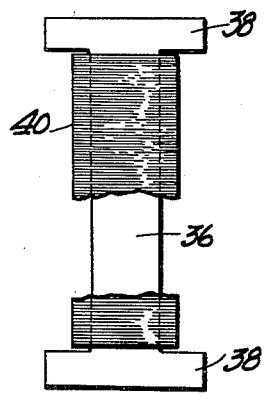
Fig. 6 shows an edge view of an energizing core.

As disclosed in detail in the above identified application, there is provided a machine base 10 on which are mounted levers 12 for journaling rolls 14 for movement to and from each other as controlled by hydraulic devices or the like, the rolls being rotated in the directions of the arrows in Fig. 2 by means of motors or the like 16. A pump 18 provides hydraulic pressure for reciprocating columns 20 vertically, the columns mounting rollers 22 for reciprocatory support of a bar 24, all as clearly disclosed in said application. The disclosure herein of this machine is merely illustrative, as the present invention is not to be limited by the machine in any way except as recited in the appended claims. The machine is duplicated as shown in Fig. 1, in order to transfer the work after a rough finish to a final finish, without the necessity of removing the work or the work holding chuck, as will be described hereinafter.

Bar 24 carries a strap or straps 26 suspending a trolley rail 28 receiving a trolley 30 carrying the new and improved work holding chuck 32.

In the present illustration of the invention the chuck or work holder 32 is magnetic and as shown is electrically energized. A plate of non-magnetic material, as at 34 is apertured at spaced intervals and each aperture receives a core in the shape of an I beam, each core having an elongated soft iron central element 36 with laterally extending flanges 38 at its ends. A winding 40 surrounds each central element 36 to cause flux to pass through the flanges at each side of plate 34. Non-magnetic filler plates 42 may be used to seal in the cores and windings. At each side surface of the work holder there is a bottom flange 44 and work pieces W, here shown as flat iron shoes, rest on the flanges at both sides of the work holder, are thereby solidly supported against the downward thrust imparted thereto by the action of the working roll 14. If desired, additional holding means in the form of pins or buttons 46 may be used to engage the work, and as herein illustrated the pins or buttons 46 are mounted on the work holder and engage the inside flanges 48 of the work pieces. Where flat iron shoes are being held, they may be alternately inverted, with a single button 46 for those pieces having the iron nose up and a pair of buttons for the pieces having the nose down.

When the chuck is work loaded at both sides, the operator initiates the starting mechanism of the machine and it operates as described in the identified application except that two sets of work pieces are worked on, as will be clear.

In order to transfer the chuck from one machine to the next, the bars 24 are provided with an alining and leveling mechanism comprising an inclined cam rod 52 on one bar and an actuator roll 54 on the other bar. As the right hand bar rises, it pulls the left hand bar to it, so that the rails are substantially continuous, thus leveling and alining the rails 28 for easy transfer of the chuck to the succeeding machine without, however, interfering with the normal operation of the vertical and horizontal reciprocation of the chuck.

It will be noted that many variations and modifications of this invention may be made, particularly as to means and methods of securing work pieces so that the entire surfaces thereof may be worked on. The pins or buttons 46 may be arranged and rearranged to accommodate smaller, larger, and more irregular pieces, so that in all cases the work holder and pieces adhering thereto may pass through the effective working area of the rolls 14, during both horizontal and vertical reciprocations of the work holder; also, the work may be arranged in particularly effective manner to obtain true flat surfaces, it being noted in this respect that in Fig. 4 the flatiron shoe to the right, having its nose down, is slightly elevated relative to the left hand work piece, having its nose up. Thus the working rolls must start work on the broader ends of the work pieces, making for more rigid support against the tool action, just prior to contact of the tool with the pointed ends, so as to prevent any possible undesired beveling at the points.

It will be seen that the above described invention carries out all the objects aimed at, and that many work pieces at both sides of the work holder will be simultaneously ground or polished, with no interference to the action of rolls 14 even though the entire surfaces of the work pieces are to be ground. The work cannot be dislodged by the working rolls because of the flanges and buttons providing against this action, and the work pieces are very easily loaded and unloaded and passed from one machine to the next for successive operations.

Having thus described my invention and the advantages thereof, I do not wish to be limited to the details herein disclosed otherwise than as set forth in the claims, but what I claim is:

1. A machine of the class described comprising a pair of working tools, a rail, means to reciprocate the rail toward and from the tools, a work holder on the rail, means providing for travel of the work holder along the rail, a second rail in extension of the first named rail, and means to cause said rails to approach each other for transfer of the work holder from one to the other rail as the first named rail reaches a certain position in the cycle of reciprocation thereof with respect to the tools.

2. The machine of claim 1 wherein said last named means comprises an inclined member on one rail and means engaging the inclined member on the other rail.

3. Abrading and polishing machine comprising at least two pairs of in line working rolls, a separate rail above each pair of rolls, separate means to reciprocate the rails toward and away from their respective rolls, a work holder slidable on one rail, and cooperating leveling means on the rails to level the same so that the work holder may be transferred from one rail to the next.

4. The machine of claim 3 wherein the leveling means comprises a cam bar on one rail and an engaging cam follower on the next rail.

5. In a machine of the class described, a magnetic work holder having two opposite spaced generally parallel magnetic work holding surfaces, in combination with a pair of spaced parallel working rotary rolls, and means on the work holder at both surfaces to engage work pieces thereon and mechanically hold the same against the thrust of the rolls, said means comprising removable pins which may be rearranged to accommodate work of varying form.

FORREST R. WHITCOMB.

REFERENCES CITED

The following references are of record in the file of this patent:

UNITED STATES PATENTS

| Number | Name | Date |
|---|---|---|
| 560,390 | Carlson | May 19, 1896 |
| 1,673,719 | Tracy | June 12, 1928 |
| 1,704,448 | Tracy | Mar. 5, 1929 |
| 2,347,170 | Brown et al. | Apr. 25, 1944 |

FOREIGN PATENTS

| Number | Country | Date |
|---|---|---|
| 476,432 | Germany | May 17, 1929 |

OTHER REFERENCES

American Machinist, February 11, 1909, page 219.